US009420038B2

(12) United States Patent
Deyerle et al.

(10) Patent No.: US 9,420,038 B2
(45) Date of Patent: *Aug. 16, 2016

(54) METHOD AND APPARATUS PROVIDING SYNCHRONIZATION AND CONTROL FOR SERVER-BASED MULTI-SCREEN VIDEOCONFERENCING

(71) Applicant: Google Inc., Mountain View, CA (US)

(72) Inventors: James Deyerle, Santa Clara, CA (US); Alan Savage, San Francisco, CA (US); Xiaohui Chen, Sunnyvale, CA (US); Christopher Lane, Brooklyn, NY (US); Antonio Petruzziello, Brooklyn, NY (US); William Shields, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,742

(22) Filed: Dec. 16, 2014

(65) Prior Publication Data

US 2015/0106436 A1   Apr. 16, 2015

Related U.S. Application Data

(63) Continuation of application No. 13/558,955, filed on Jul. 26, 2012, now Pat. No. 8,937,637.

(51) Int. Cl.
*H04N 7/14* (2006.01)
*H04L 29/08* (2006.01)
(Continued)

(52) U.S. Cl.
CPC ............ *H04L 67/10* (2013.01); *H04L 65/1069* (2013.01); *H04L 65/403* (2013.01); *H04L 65/60* (2013.01); *H04L 67/32* (2013.01); *H04N 7/15* (2013.01)

(58) Field of Classification Search
USPC .............. 348/14.01–14.08; 709/204; 725/62, 725/106, 133, 141, 153; 379/201.01–218.01
See application file for complete search history.

(56) References Cited

U.S. PATENT DOCUMENTS

| 5,745,161 | A | * | 4/1998 | Ito | ............................ | H04N 7/15 348/14.09 |
| 6,025,871 | A | * | 2/2000 | Kantor | .................. | G06F 3/1423 348/14.03 |

(Continued)

OTHER PUBLICATIONS

Notice of Allowance dated Sep. 18, 2014 for U.S. Appl. No. 13/558,955.

(Continued)

*Primary Examiner* — Maria El-Zoobi
(74) *Attorney, Agent, or Firm* — IP Spring (57) ABSTRACT

A videoconferencing system in which multiple browsers are utilized to present content and control functions for a server based videoconference. The content of the videoconference (e.g., video and audio streams) is presented on a display device driven by a local computer running a browser. The local computer also runs a separate browser that presents control functions on a different display device (e.g., a touch screen). The system can be scaled to include additional monitors and browsers running on the local computer. A local server is provided on the local computer for facilitating communications among the locally running browsers. In this manner, the browsers can communicate with each other via the local server executing on the local computer. The need to send traffic to a remote server to effectuate the browser-to-browser communication is eliminated. This provides for reduced latency and lowers the demands on the remote server.

20 Claims, 9 Drawing Sheets

(51) Int. Cl.
*H04N 7/15* (2006.01)
*H04L 29/06* (2006.01)

(56) References Cited

U.S. PATENT DOCUMENTS

| | | |
|---|---|---|
| 7,469,302 B2 | 12/2008 | Whittle et al. |
| 2004/0085366 A1 | 5/2004 | Foster et al. |
| 2005/0050301 A1 | 3/2005 | Whittle et al. |
| 2007/0038641 A1 | 2/2007 | Fawcett et al. |
| 2007/0157304 A1 | 7/2007 | Logan et al. |
| 2010/0274922 A1 | 10/2010 | Reavely |
| 2011/0166968 A1* | 7/2011 | Houng .............. H04N 5/44 705/30 |
| 2012/0079419 A1* | 3/2012 | Ajitomi ............. G06F 9/4443 715/781 |

OTHER PUBLICATIONS

Non-Final Rejection dated May 29, 2014 for U.S. Appl. No. 13/558,955.
Final Rejection dated Jun. 13, 2013 for U.S. Appl. No. 13/558,955.
Non-Final Rejection dated Jan. 9, 2013 for U.S. Appl. No. 13/558,955.

* cited by examiner

METHOD AND APPARATUS PROVIDING SYNCHRONIZATION AND CONTROL FOR SERVER-BASED MULTI-SCREEN VIDEOCONFERENCING

CROSS-REFERENCE TO RELATED APPLICATIONS

This application is a continuation of U.S. application Ser. No. 13/558,955 filed Jul. 26, 2012, the disclosure of which is expressly incorporated herein by reference in its entirety.

BACKGROUND

Video conferencing among two or more computers has been performed in the past by connecting separate web browsers running on separate computers to a remote server. Web browsers may be referred to herein as "web applications" or "browsers." Examples of common web browsers include Google® Chrome™, Microsoft® Internet Explorer®, Mozilla® Firefox®, Apple® Safari®, among others. Once connections are established between the various web browsers and the remote server, content and control information may be provided from the server to the various browsers running on the various computers. For example, the server may receive streaming content from each browser, processes the streaming content, and make the content available back to the browsers in a formatted manner. The remote server controls the information that is received and made available to the browsers on an individual basis. If a browser seeks to change a format or otherwise provide modified control information, such control information is transmitted to and processed by the remote server. Depending on the processing, the remote server might modify content, format or control information made available to all or some of the browsers. In this manner, functionality of the browsers supporting the videoconference requires communication and processing by the remote server.

In instances where the server operates to provide control and content information to the browsers, latency is incurred as information is processed from one browser and made available to the others. For example, such information might move through several stages of processing and transmission: the information may be initially processed by a browser for transmission to the server, the information may be transmitted through the web, the information may be received and processed by the server, action may be taken and the result may be made available to any other appropriate browsers connected to the server. The server in such instance carries a substantial portion of the processing load.

Such deficiencies discourage the use of multiple browsers at a single location. If it were attempted, latency would be expected and additional loads would be placed on the server among other things. Even if two browsers were open in a single browser application loaded on a single machine, they would still be expected to coordinate through the server thereby incurring the undesirable latency, server burden and other problems.

When two separate browser instances wish to communicate information (i.e., two separate browser windows open on the same machine), a conventional technique involves use of a "hanging get" or the like to facilitate communications. When a first browser communicates a message to a second browser, the local machine on which the two browsers are running makes a request over the Internet to a remote server to open a communication channel between the local machine and the remote server. When the remote server receives the request, the remote server leaves a communication link between the remote server and the local machine that is executing the two browsers. The local machine is able to send information to the remote server when needed. After processing, the server can then make the information available to the second browser. In this manner, hanging gets allow the remote server to push notifications to the local machine without the local machine having to poll for updates. Also, when a first browser wants to send a message to another browser, the first browser may post a message to the remote server over HTTP via the communication channel. In response, the remote server may write the message back to the other connected browser(s) over the established "hanging get" communication channel to complete the notification from the first browser to the second browser.

Hanging gets provide an expensive implementation, from the server's standpoint, because the server has to keep this a hanging get communication channel open until the local machine is disconnected. This limits the number of simultaneous connections the server can handle, which means the service being provided does not scale well. There is also a latency problem with hanging gets because messages are transmitted from the client to the remote server and then back. In addition, a discovery problem exists since the server needs to know which browser should receive the message when the server sends the message back to the client via the communication channel.

Accordingly, there remains a need for a method and apparatus providing synchronization and control for server-based multi-screen videoconferencing. There further remains a need for a method and apparatus allowing two browsers to communicate while addressing the drawbacks and limitations discussed above.

SUMMARY

In some instances, a video conferencing system apparatus is provided which includes a content display device coupled to a local computer and displaying streaming images provided by a remote server, the streaming images being displayed by a first browser executing on the local computer and communicatively coupled to the remote server; a control display device coupled to the local computer and displaying a control interface, the control interface being displayed by a second browser executing on the local computer, such second browser receiving commands through the control interface of the control display device; and a local communication server executing on the local computer and communicatively coupled to the first browser and the second browser, the local communication server receiving such a command from the second browser and transmitting such command to the first browser displaying the streaming images so that the command is capable of being executed by the first browser independently of communications with the remote server.

In other instances, a method and non-transitory computer-readable storage medium for updating one or more browsers executing on a computer system are provided for receiving an update from a first browser executing on the computer system at a local communication server executing on the computer system; identifying, with the local communication server, one or more other browsers executing on the computer system that should receive such update, wherein at least one of the one or more other browsers displays an image received from a remote server external to the computer system; and transmitting from the local communication server such update to the one or more other browsers without requiring the remote server to receive and retransmit such update.

In still other instances, a system for updating one or more browsers executing on a computer is provided which includes a remote server and a local computer device coupled to the remote server and executing one or more browsers. The computer device further executes a local communication server configured to: receive an update from a first browser executing on the local computer device at the local communication server; identify, with the local communication server, one or more other browsers executing on the local computer device that should receive such update, wherein at least one of the one or more other browsers displays an image received from the remote server; and transmit from the local communication server such update to the one or more other browsers without requiring the remote server to receive and retransmit such update.

DETAILED DESCRIPTION OF EXAMPLES

Face-to-face or in-person interactions among groups of individuals allow each individual to observe the behavior, mood, expressions, tone, and the like of the other individuals in the group. Group interactions can facilitate relationship building by creating shared experiences. Traditionally, such group interactions were restricted to in-person congregations of the group. With all of the individuals together, they are able to share experiences like mutually participating in interactive sessions or audio/visual presentations. The camaraderie can be substantial and long-lasting.

More recently, face-to-face group meetings among participants at remote locations have been permitted with live video and audio feeds of each of the participants. Each of personal computers (PCs), personal digital assistants (PDAs), and mobile phones with advanced computing capabilities (i.e., "smartphones") are now commonly equipped with both microphones and video cameras that provide the basic resources for creating a shared session among a group of individuals.

Such shared sessions rely on Internet-based communication protocols such as "Voice over IP" (VoIP). Streams of video and audio packets are created, transmitted across the Internet, and decoded and reassembled in a manner permitting each recipient to hear and see the other participants in a face-to-face manner.

The shared sessions can be presented to a user via stand-alone conferencing applications executing on the user's device or via one or more browser applications. In some embodiments, when the shared sessions are presented to the user via a browser application. In one example of a two-browser shared session, a first browser may present the audio and video content of the shared session (i.e., acting as a "display browser") and the second browser may be a "control browser" for controlling various aspects of the shared session, e.g., volume, mute, video zoom in/out, etc. In other embodiments, any number of display browsers and any number of control browsers may be presented to users at the same location.

Embodiments of the detailed description provide an apparatus and method by which two or more browsers can communicate with one another. An example application includes implementation to facilitate a multi-browser shared session. According to various embodiments, a local server is executing on the same machine as the two or more browsers and is configured to communicate with the two or more web browsers. In one example, the local server comprises a WebSocket server though other messaging protocols besides WebSocket can also be used to implement the local server. When a first browser wishes to communicate with a second browser, the first browser sends a message to the local server. The local server then transmits a copy of the message to the second browser and/or to any additional browsers that should receive the message. In this manner, the browsers can communicate with one another without the need to transmit messages to and from a remote server, as is required with the "hanging get" protocol.

Figure 1:
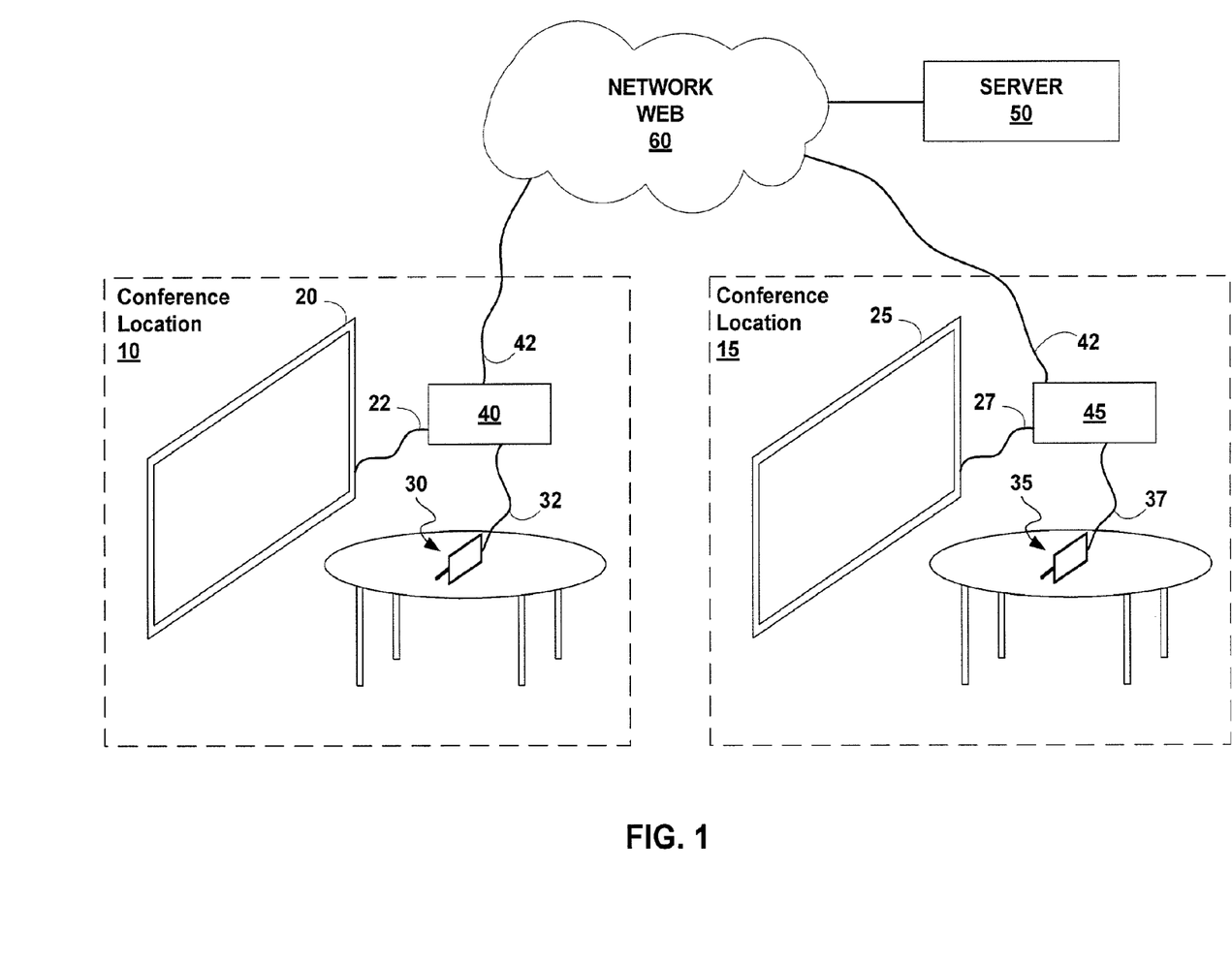
FIG. 1 is a diagram of an example video conferencing apparatus including multiple screens.

An example multi-screen videoconferencing system is depicted in FIG. 1. The depicted system includes two multi-screen conferencing locations, but there could be more. FIG. 1 specifically depicts a first local conferencing location 10 and a second local conference location 15. As depicted, these could be conference rooms. In the example of FIG. 1, the conference location 10 includes a large screen monitor 20 and a small monitor 30. Conference location 15 includes a large screen monitor 25 and a small monitor 35. The small monitors 30 and 35 can be comprised of any single or multiple combinations of monitor and input devices. As depicted, touch screen monitors 30 and 35 are provided with a connection to a computer 40 or 45 through communication lines 32 and 37, respectively, e.g, a USB connection. The large monitors 20 and 25 are similarly connected to the computers 40 and 45 through communication lines 22 and 27, respectively, e.g., a coax, RGB cable, VGA, etc. The computers 40 and 45 are also connected through communication links 42 and 47, respectively, to a remote server 50, through a network web 60, such as the world wide web, an extended network, a VPN, or the like.

The computers 40 and 45 are provided with multiple independent browsers (including separate browser applications and browser pages, etc.) executing. First browsers running on the computers 40 and 45 are configured to display on the large screen monitors 20 and 25, and second browsers are configured to display on the small monitors 30 and 35. Content is provided by the server 50 and displayed by the first browsers on the large screen monitors 20 and 25. The content may be formatted to reflect certain control functions and status displays. The first browsers can also be connected directly or indirectly to a sound microphone and video camera, or a combination thereof. Sound and video content is provided by the first browser to through the network 60 to the remote server 50.

Second browsers receive control information and display it upon small monitors 30 and 35. The second browsers also receive control information from the second monitors 30 and 35. In some instances, the control information relates to activities occurring on the first browser, as for example the receipt and establishment of content. When a user inputs a change in connection with the small control monitor 30 or 35, the second browser adjusts the control screen and transmits the control change to the server 50. The second browser also communicates the control change to a local server which is in connection with the first browser. In this manner, the second browser can update the first browser without reliance on the remote server 50. The remote server 50 is still updated, but more to update the remote browsers rather than the local browser where the change occurred. In one embodiment, the first browsers and the second browsers comprise separately executing instances of two or more browser applications. In another embodiment, the first browsers and the second browsers comprise browser tabs within a single executing browser instance.

Figure 2:
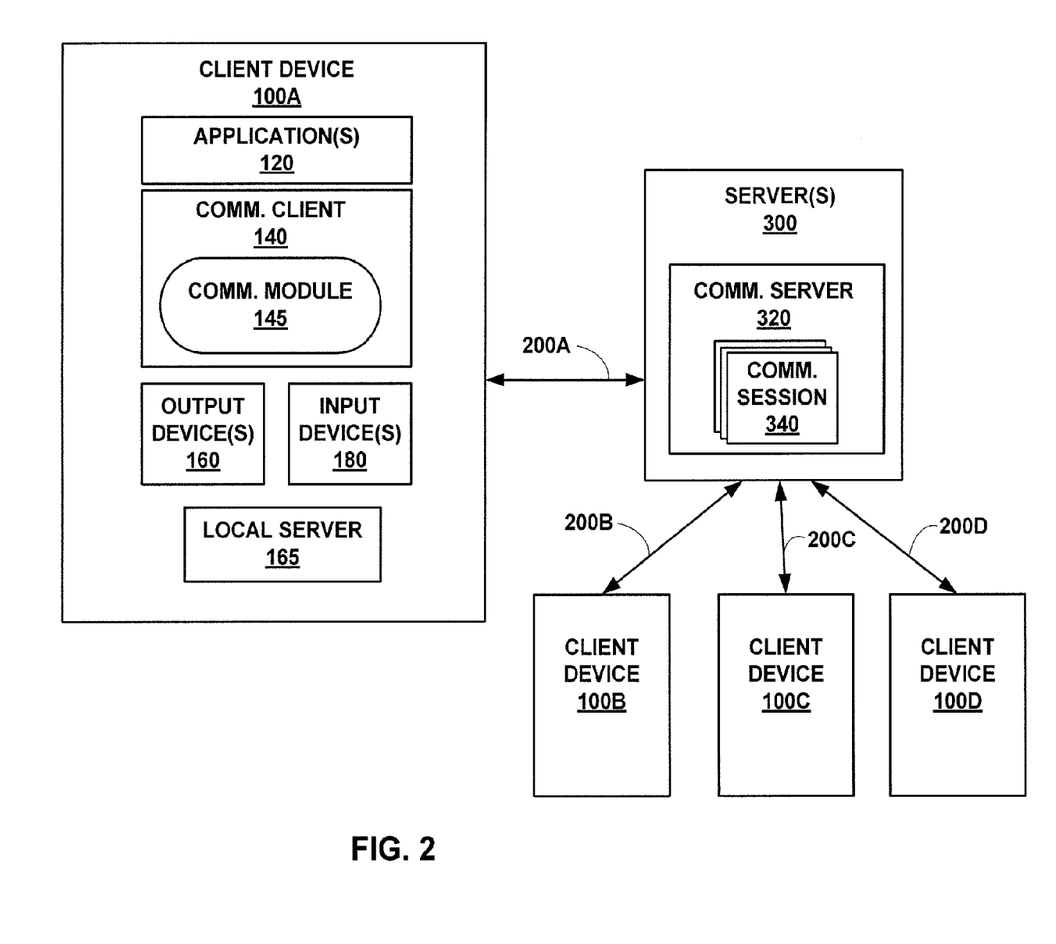
FIG. 2 is a block diagram of an example data delivery environment, according to one embodiment.
Figure 3:
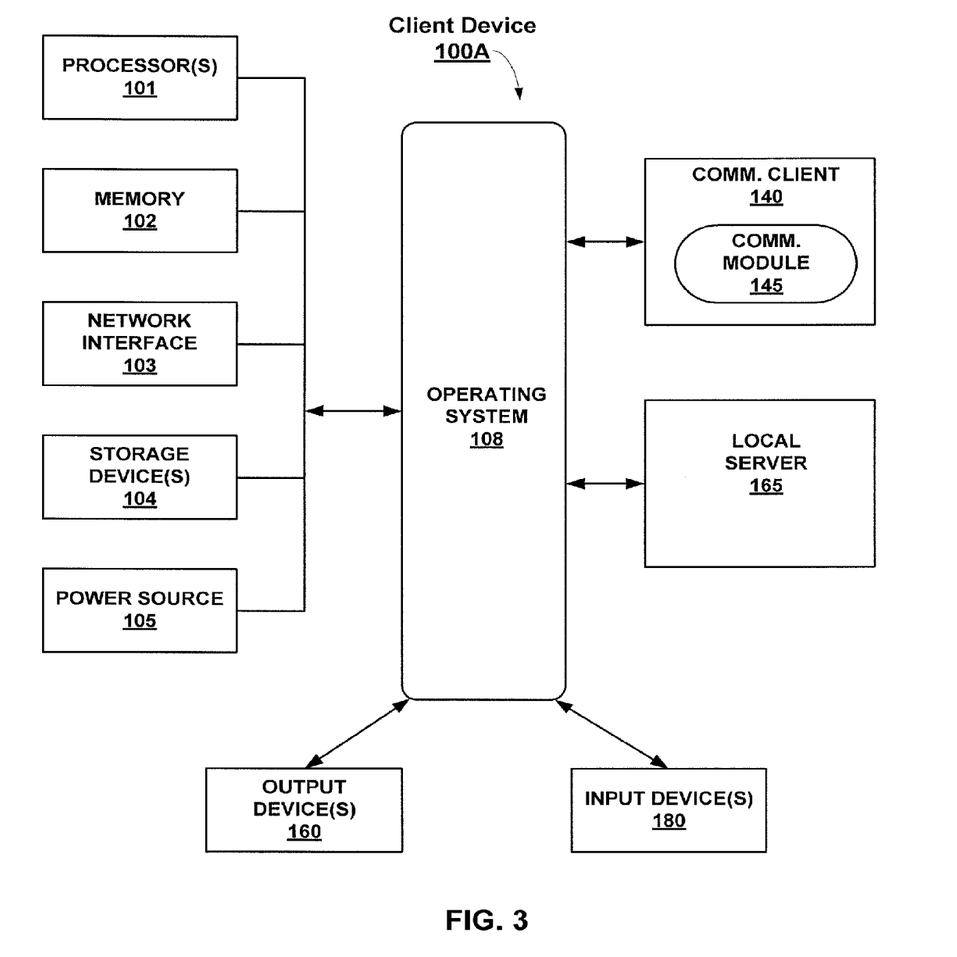
FIG. 3 is a block diagram of example functional components for one of the client devices in FIG. 2, according to one embodiment.

FIGS. 2-3 depict an example data delivery environment that might be implemented to support the video conferencing system depicted in FIG. 1. The illustrated environment is presented as an example, and does not imply any limitation regarding the use of other data delivery environments. To the contrary, the description contemplates all implementations of data delivery environments that have the capability to communicate between two browser instances.

As shown in FIG. 2, the data delivery environment includes server(s) 300 in communication with one or more client devices 100A-100D. Examples of client devices 100A-100D include, but are not limited to, portable, mobile, and/or stationary devices such as landline telephones, mobile telephones (including "smartphones"), laptop computers, tablet computers, desktop computers, personal digital assistants (PDAs), portable gaming devices, portable media players, e-book readers, Internet-enabled televisions, or Internet-enabled appliances, among others. In some embodiments, two or more client devices 100A-100D are the same type of device. For example, client devices 100A and 100B may both be desktop computers. In other embodiments, two or more client devices are different types of devices. For example, client devices 100A and 100B may both be desktop computers and client device 100C may be a smartphone.

In the embodiment illustrated by FIG. 2, the client devices 100A-100D communicate with a server(s) 300 via communications channels 200A-200D, respectively. In one embodiment, the communications channels 200A-200D include an Internet connection between the client devices 100A-100D and the server(s) 300. In other embodiments, the connection may be over cellular phone network or other type of network. The server(s) 300 often comprise multiple physical servers such as a communications server 320 for maintaining or "hosting" one or more communication sessions 340. According to various embodiments, each server can be a physically separate machine or can be different processes running within the same physical machine.

The client device 100A of FIG. 2 includes application(s) 120, communications client 140, output devices 160 (e.g., a display), and input devices 180 (e.g., keyboard, mouse, touch screen). In some embodiments, a device may act as both an output device and an input device. An example of web application(s) 120 is a web browser application. Web application(s) 120 provide the client device 100A with a variety of functionalities. Examples include social media functionality, web browsing capabilities, calendars, contact information, games, and document processing, document sharing, among others. Web application(s) 120 employ the output devices 160 to display information at a graphical user interface (GUI).

The communications client 140 further includes a communications module 145 that enables output devices 160 to display information at the GUI. The communications module 145 also enables the communications client 140 to connect to the server(s) 300. Typically, the communications module 145 is a network module that connects the client device 100A to a network, such as the Internet or a cellular phone network, using one of a variety of available network protocol techniques. The GUI is configured to display data (such as, for example, audio and video data) received from the server(s) 300 over the communications channel 200A.

As also shown, client device 100A includes a local server 165. In some embodiments, the local server 165 comprises a WebSocket server. As described in greater detail herein, the local server 165 provides a mechanism for two separate browser instances running on the client device 100A to communicate with one another without the need for communicating with remote server(s) 300.

In some embodiments, client devices 100B-100D include similar elements and functions as client device 100A. In other embodiments, client devices 100B-100D include different, fewer, or more elements and functions as client device 100A.

Referring now to FIG. 3, one particular example of client device 100A is illustrated. Many other embodiments of the client device 100A may be used. In the illustrated embodiment of FIG. 3, the client device 100A includes one or more processors 101, memory 102, a network interface 103, one or more storage devices 104, a power source 105, output device(s) 160, and input device(s) 180. The client device 100A also includes an operating system 108, a communications client 140, and a local server 165 that are executable by the client. Each of components 101, 102, 103, 104, 105, 160, 180, 108, 140, and 165 are interconnected physically, communicatively, and/or operatively for inter-component communications in any operative manner.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100 during operation. In some embodiments, memory 102 includes a temporary memory, area for information not to be maintained when the client device 100 is turned OFF. Examples of such temporary memory include volatile memories such as random access memories (RAM), dynamic random access memories (DRAM), and static random access memories (SRAM). Memory 102 maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100A uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB (Universal Serial Bus). In some embodiments, the client device 100A uses network interface 103 to wirelessly communicate with an external device such as the server(s) 300 of FIG. 2, a mobile phone, or other networked computing device.

The client device 100A includes one or more input devices 180. Input device 180 is configured to receive input from a user through tactile, audio, and/or video feedback. Non-limiting examples of input device 180 include a presence-sensitive screen, a mouse, a keyboard, a voice responsive system, a video camera, a microphone, or any other type of device for detecting a command from a user. In some examples, a presence-sensitive screen includes a touch-sensitive screen.

One or more output devices 160 are also included in client device 100A. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user. In some embodiments, a device may act as both an input device and an output device.

The client device 100A includes one or more power sources 105 to provide power to the client device. Non-limiting examples of power source 105 include single-use power sources, rechargeable power sources, and/or power sources developed from nickel-cadmium, lithium-ion, or other suitable material.

The client device 100A includes an operating system 108, such as the Android® operating system. The operating system 108 controls operations of the components of the client device 100A. For example, the operating system 108 facilitates the interaction of communications client 140 and local server 165 with processors 101, memory 102, network interface 103, storage device(s) 104, input device 180, output device 160, and power source 105.

As illustrated in FIG. 3, the client device 100A includes communications client 140 and local server 165. Communications client 140 includes communications module 145. Each of communications client 140, communications module 145, and local server 165 includes program instructions and/or data that are executable by the client device 100A. For example, in one embodiment, communications module 145 and/or local server 165 includes instructions causing the communications client 140 and/or local server 165 executing on the client device 100A to perform one or more of the operations and actions described in the present disclosure. In some embodiments, communications client 140 and/or communications module 145 and/or local server 165 form a part of operating system 108 executing on the client device 100A.

Figure 4:
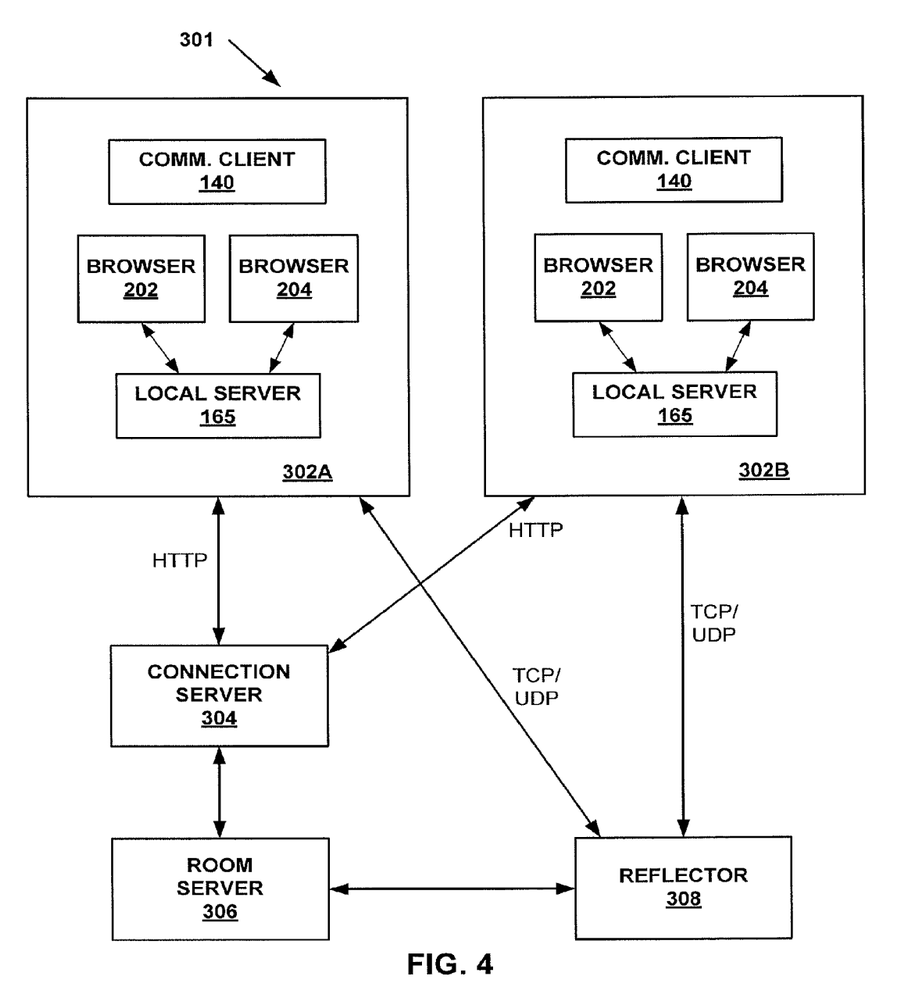
FIG. 4 is a conceptual diagram illustrating a system for providing communications sessions, according to one embodiment.

FIG. 4 is a conceptual diagram illustrating a system 301 for providing communications sessions, according to one embodiment. As shown, system 301 includes client devices 302A, 302B, a connection server 304, a room server 306, and a reflector 308. In one embodiment, client devices 302A, 302B may be similar to or the same as client devices 100A-100D shown in FIG. 2. As shown in the simplified diagram in FIG. 4, the client devices 300A, 300B include a communications client 140, browsers 202, 204, and a local server 165.

The system 301 provides a mechanism for two or more users to interact in the same virtual location, which may be described as a communication session. The communication session may be, for example, a video conferencing session. A communication session supports multiple users, using diverse communication tools, to interact, collaborate, and/or share information and experiences in the same virtual environment. In an Internet environment, the communication session is hosted by one or more servers that support communications sessions with user machines equipped with resources such as microphones and video cameras. For example, individuals participating in a communication session may share and watch videos, play games, participate in video, audio, or text chat, surf the web, seek or provide assistance regarding a particular problem, or any combination thereof. In other words, a communication session is where individuals may share an experience substantially similar to interacting in person at the same physical location.

When an individual desires to interact with a group of others in a virtual environment, the individual employs a client device, such as client device 302A, to either initiate a communication session or join an existing communication session. When establishing a new communication session, the individual may invite others to join the session.

In one embodiment, to join an existing communication session, each participant is invited. Invitations may be delivered in many different manners including via e-mail or text messaging services. A user can request joining an existing communication session even though the user has not received an invitation, assuming the URL for the session is known. Additionally, users participating in a communication session may cause the session to link to external resources and integrate those external resources into the participant's graphical user interface (GUI).

In other embodiments, each communications session is associated with a "session name." The session name may be an alpha-numeric string of characters that uniquely defines the communication session. To join a communication session, in some embodiments, the user may enter the session name into a control browser, as described herein. Some communication sessions may also be password protected.

An example of user workflow for joining a communication session is provided below. The user enters a session name into a browser 202 configured to the accept session names. In one example, browser 202 is a control browser and browser 204 is a display browser, as described above. Browser 202 is configured to communicate with communications client 140 installed on the client device 302A. The communications client 140 is configured to communicate with connection server 304. In other embodiments, the browsers 202, 204 are configured to directly communicate with the connection server 304. In one embodiment, the communication between the communications client 140 and/or browsers 202, 204 and connection server 304 is over the HTTP protocol (Hypertext Transfer Protocol), though it could be others available for similar functionality. The communications client 140 and/or browsers 202, 204 are configured to transmit a message to the connection server 304 that includes the session name entered by the user.

The connection server 304 receives the message that includes the session name. The connection server 304 is configured to translate the session name to a unique and deterministic identifier for the communication session that the user desires to join. In one example, the deterministic identifier is a Jabber Identifier (JID) or similar network connection identifier providing similar functionality. In the embodiment utilizing JID, communicated information may include a node identifier, a domain identifier, and a resource identifier.

The connection server 304 is configured to interact with a room server 306 that is configured to manage the virtual "rooms" for the various communications sessions. The connection server 304 is configured to transmit the deterministic identifier to the room server 306 and/or the client device 300A.

Based upon such information, the room server 306 determines whether a communications session having the deterministic identifier has already been created. If not, then the room server 306 creates a new virtual room for the new communications session.

A reflector 308 is in communication with the room server 306 and manages the virtual rooms of the communications sessions. The reflector 308 is configured to interact with client devices 300A, 300B to provide the video and audio content of the communication session to the various client devices. In one example, the communication between the reflector 308 and the client devices 300A, 300B is via a TCP (Transmission Control Protocol) or UDP (User Datagram Protocol) connection, though it may include any protocol with similar functionality.

Each deterministic identifier corresponds to a particular reflector 308 associated with the communication session and is used by the connection server 304 to establish a connection between the client devices 300A, 300B and the particular reflector 308. The one or more client devices 300A, 300B are configured to send audio and video content to the reflector 308.

The reflector 308 receives content from several separate client devices 300A, 300B and buffers all incoming packets before synchronizing them and reordering them into various data sessions corresponding to each device connected to a communication session. In the example embodiment, these data sessions (or "real-time" sessions) are RTP sessions that include multiple RTP streams, thought any similar functioning protocols could be implemented. For example, an RTP session provided by the reflector 308 corresponding to a particular client device includes all content received at the reflector except for the content received from that particular client device. Thus, the reflector 308 would provide an RTP session to that particular client device including RTP streams received at the reflector from all other client devices in the communication session.

In one embodiment, each of the communications server 304, room server 306, and reflector 308 is included in server(s) 300 shown in FIG. 2. FIG. 4 only depicts a particular reflector 308 corresponding to a particular communication session, but it will be appreciated that a plurality of reflectors may reside in the system 301. While FIG. 4 depicts all these modules as being a part of server(s) 300, it will be appreciated that the implementation of these modules may be spread across different tangible servers and that certain modules may be a separate component in communication with the modules of the server(s) 300. It will further be appreciated that certain modules can be combined into a single module, for example, the communications server 304 and room server 306 may be combined into a more comprehensive module. In other embodiments, the various components may be integrated into a single platform while maintaining their individual functionality and identity, such platform may be a single server or distributed application.

As described and as shown in FIG. 4, in some embodiments, the client device 300A may include multiple browsers.

One browser may comprise a display browser for displaying the video and audio content of the communication session and another browser may comprise a control browser for controlling various aspects of the communication session.

Figure 5:
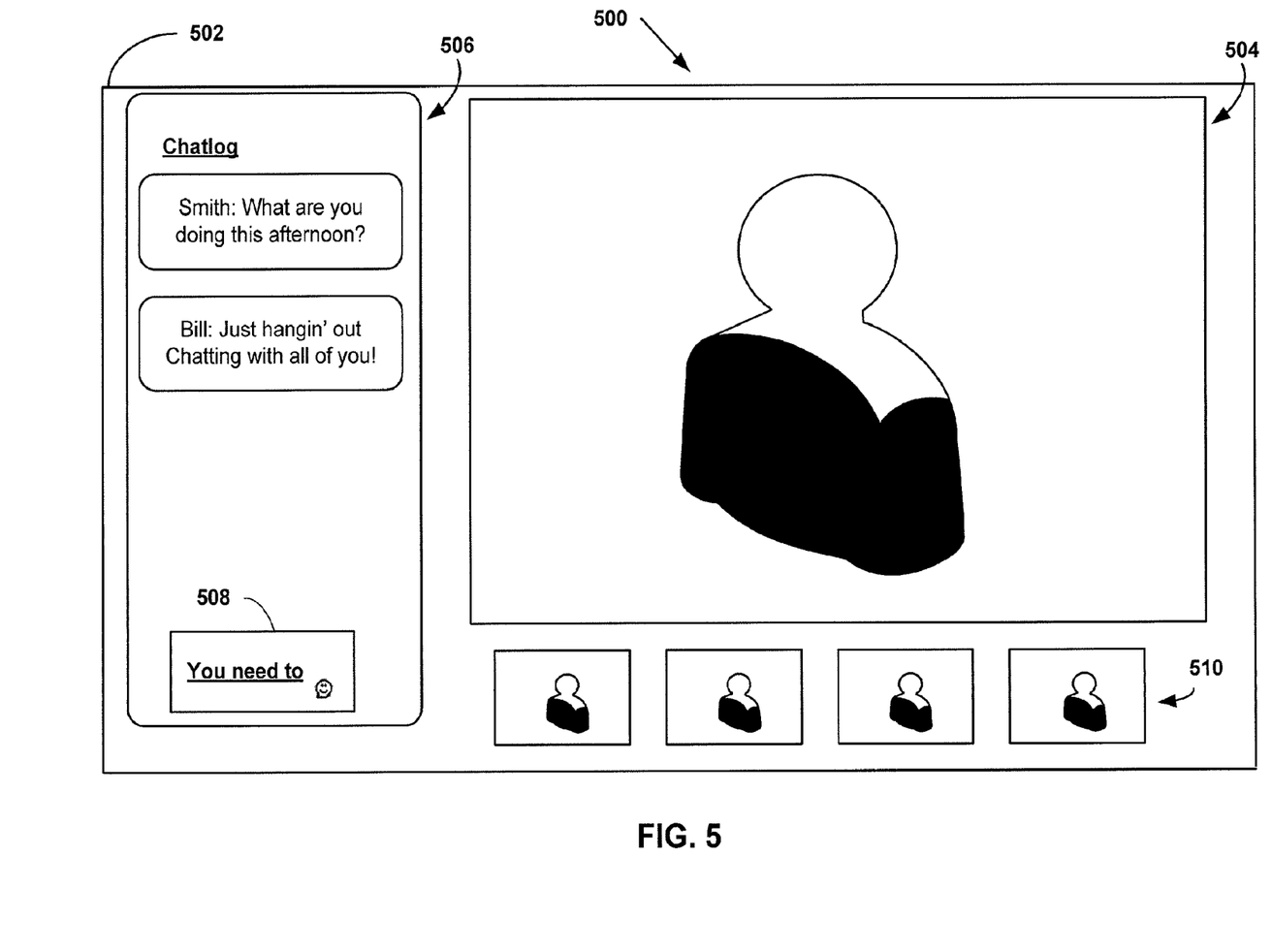
FIG. 5 is a conceptual diagram illustrating a display browser in a multi-browser system, according to one embodiment.

FIG. 5 is a conceptual diagram illustrating a display browser 502 in a multi-browser system, according to one embodiment. The display browser 502 may be presented to the user on a display device 500 coupled to the client device. For example, the display device 500 may be an LCD or plasma display. The display browser 502 may be presented on the display device 500 in "full-screen" mode. In such a case, the user may not even be aware that the display device 500 is presenting a web browser on the display device 500.

A client application, such as communications client 140, supports communication session functionality. The client application exposes a number of features to the user through a GUI. These graphically displayed features include a video display 504 of one or more participants in the communication session. A chat log 506 is also provided, including a chat history and a field 508 where a user can input text to the chat conversation. The display browser 502 is also configured to display graphical images 510 that are associated with participants in the communication session. Graphical images 510 include images of users currently participating in the communication session.

Figure 6:
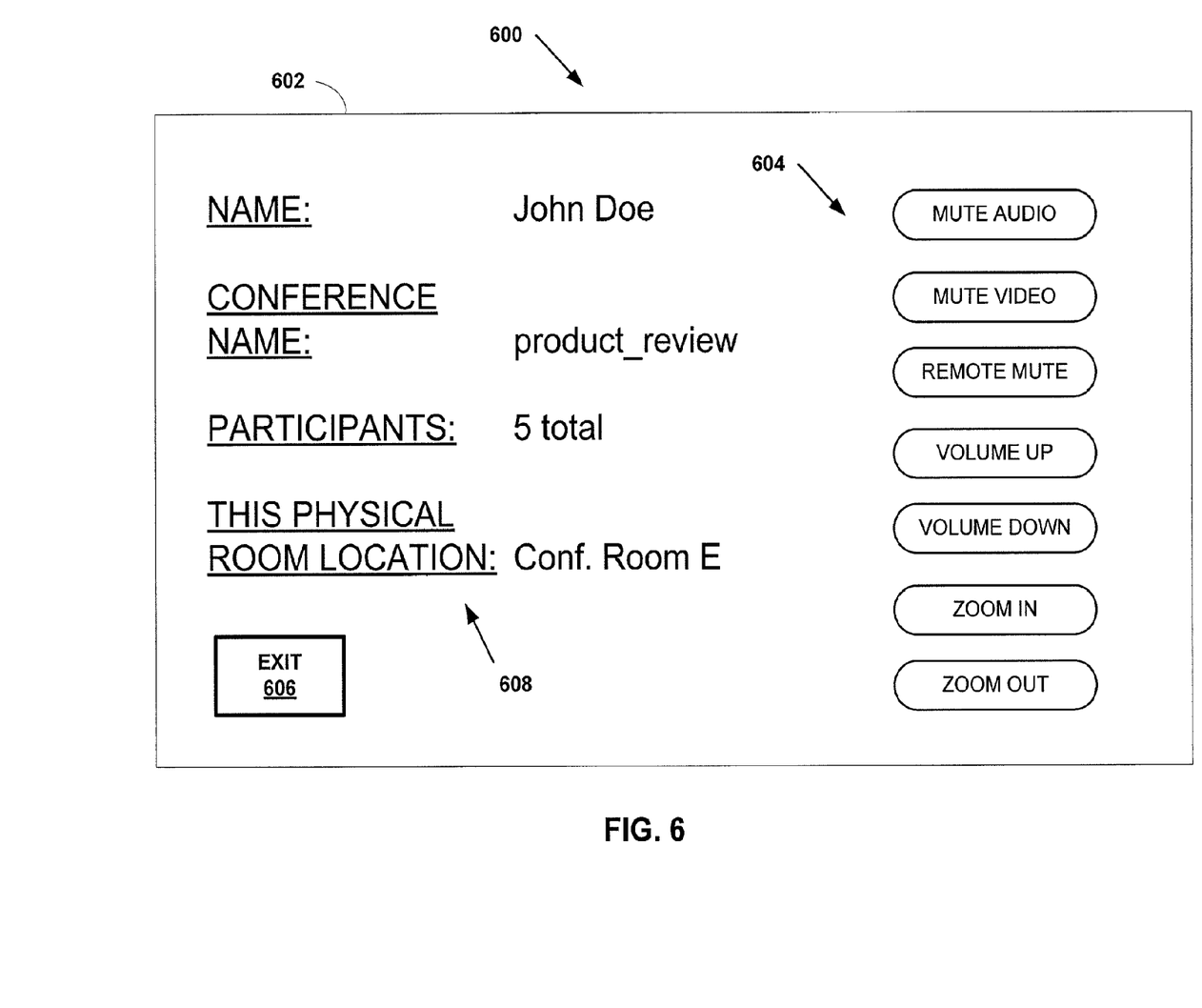
FIG. 6 is a conceptual diagram illustrating a control browser in a multi-browser system, according to one embodiment.

FIG. 6 is a conceptual diagram illustrating a control browser 602 in a multi-browser system, according to one embodiment. The control browser 602 may be presented to the user on a display device 600 coupled to the client device. For example, the display device 600 may be a touch-sensitive display device for receiving input. The control browser 602 may be presented on the display device 600 in "full-screen" mode. In such a case, the user may not even be aware that the display device 600 is presenting a web browser on the display device 600.

As described, the control browser 602 provides an interface for a user to control various aspects of the communication session. The control browser 602 may also present identifying information 608 about the user and the communication session, such as the user's name, a name of the communication session, a total number of participants in the communication session, a physical location of the user. The control browser 602 may also provide one or more interface buttons 604 by which a user can control various aspects of the communication session. Examples of interface buttons 604 include buttons to mute a user's audio feed, mute/blackout a user's video feed, remote mute another user, increase/decrease audio volume, zoom video in/out, among others. An exit button 606 may also be provided for the user to exit the communication session.

In operation, a user may select one of the interface buttons 604 to control certain aspects of the communication session. For example, the user may desire to mute himself or herself. The user would select the appropriate interface button 604. In response to the selection of an interface button 604, the control browser 602 transmits a message to the local server 165 executing on the client device that is coupled to the display device 600 and executes the control browser 602. The local server 165 receives the message and transmits the message to the display browser 502 shown in FIG. 5. The display browser 502 is also executing on the same client device as the local server 165.

The display browser 502 receive the message and takes appropriate action in response to the message. For example, if the message is related to the mute function, the display browser 502 disables the microphone that the user is speaking into. Also, the display browser 502 may display an icon indicating that the user is muted. In addition, the display browser 502 sends a message to the connection server 304 corresponding to the desired action. The messages may be sent via the HTTP protocol or any other protocol with similar functionality.

The connection server 304 receives the message from the first browser executing on a client device and transmits a corresponding message to the other client devices participating in the communication session. The other client devices also take appropriate action, including, for example, displaying an icon next to the user indicating that the user is muted.

Figure 7:
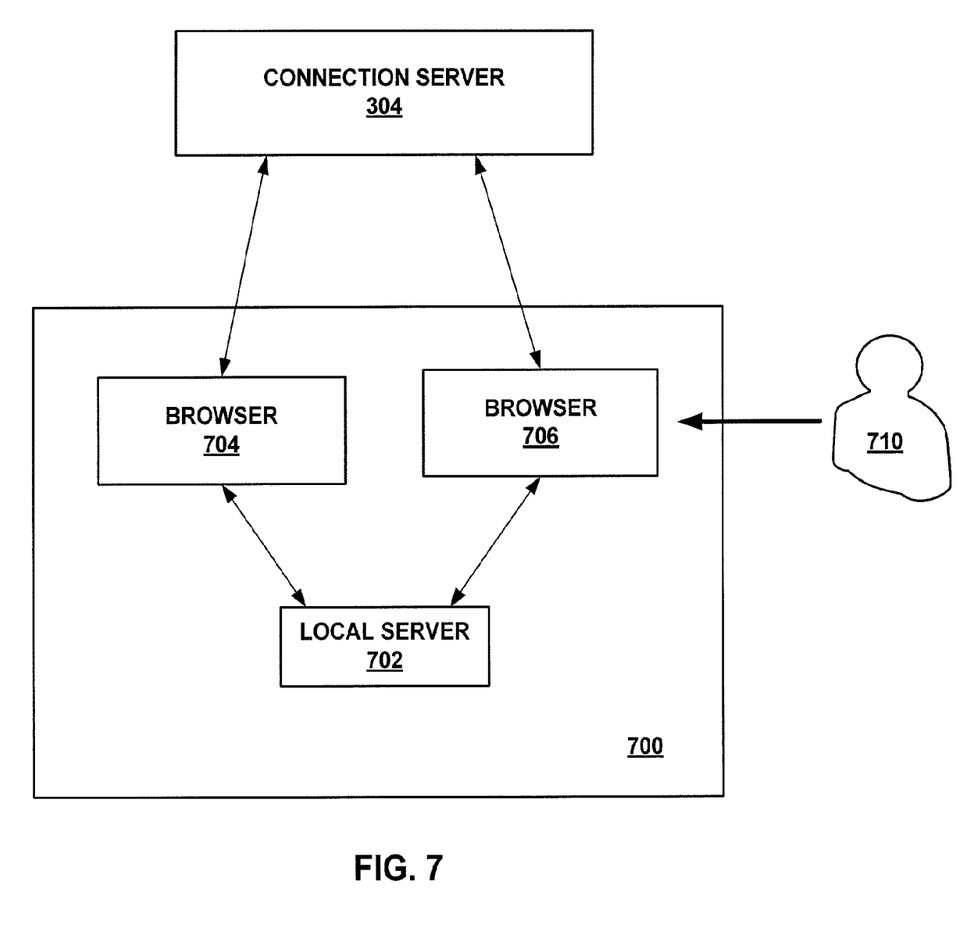
FIG. 7 is a conceptual diagram illustrating communication between two web browsers via local server, according to one embodiment.

FIG. 7 is a conceptual diagram illustrating communication between two web browsers via local server, according to one embodiment. As shown, a client device 700 is executing a display browser 704, a control browser 706, and a local server 702. The display browser 704 and the control browser 706 are each configured to communicate with the local server 702. In one example, the local server 702 may be a WebSocket server. Also, each of the display browser 704 and the control browser 706 is coupled to the connection server 304 via an HTTP connection.

When a user 710 wishes to change some aspect of a communication session, the user makes an input via the control browser 706. The control browser 706 sends a message to the local server 702, which then sends a message to the display browser 704. The display browser 704 then takes appropriate action in response to the message. The display browser 704 also sends a message to the connection server 304 to relay the message to the other client devices participating in the communication session. In this manner, communications sent between the control browser 706 and the display browser 704 pass through the local server 702, which is executing on the same client device 700 as the control browser 706 and the display browser 704. Therefore, the communication sent between the control browser 706 and the display browser 704 does not need to be sent to any remote servers outside the client device 700, such as the connection server 304.

Figure 8:
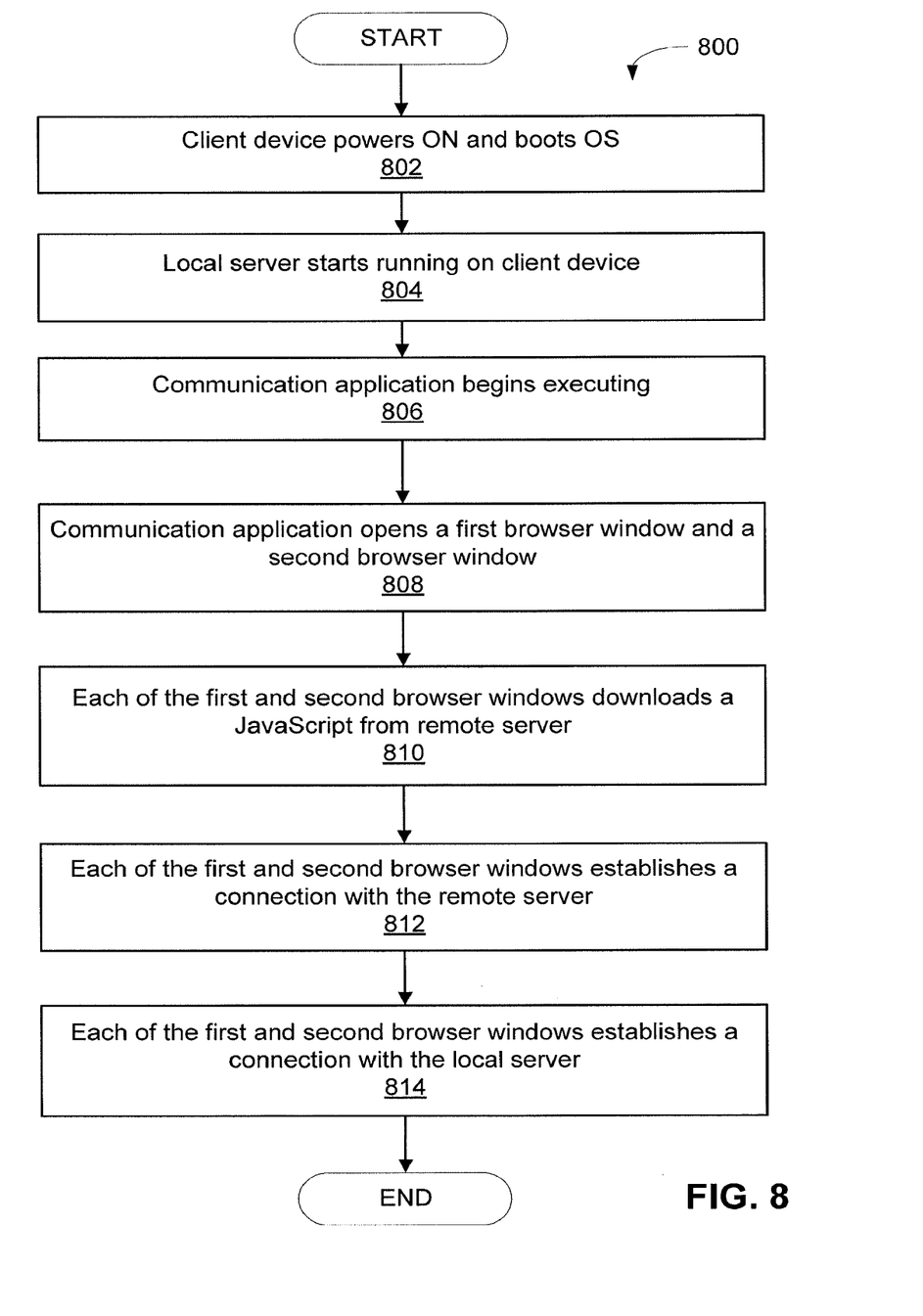
FIG. 8 is a flowchart illustrating initializing a two-browser communication session platform, according to one embodiment.

FIG. 8 is a flowchart illustrating initializing a two-browser communication session platform, according to one embodiment. Persons skilled in the art will understand that even though the method 800 is described in conjunction with the systems of FIGS. 1-7, any system configured to perform the method stages is within the scope of embodiments of the disclosure.

As shown, at stage 802, a client device powers ON and boots an operating system (OS). At stage 804, a local server starts running on the client device. In some embodiments, an "autorun" feature may be enabled on the client device that causes the local server to start running once the client device is powered ON and the OS is booted. In one embodiment, the local server is a WebSocket server. In other embodiments, the local server may be server configured with a different messaging protocol different from WebSocket.

At stage 806, a communication application begins executing. In some embodiments, an "autorun" feature may be enabled on the client device that causes the communication application to start executing once the client device is powered ON and the OS is booted. In some embodiments, the communication application comprises the communications client 140 described herein. In some embodiments, the communication application is configured to detect the hardware devices coupled the client device. For example, the communication application may determine the type and number of the display devices and input devices coupled to the client device. One technique may involve the communication application analyzing the serial numbers of the hardware devices coupled to the client device and identifying the devices based on their serial numbers. Depending on the count and number of different hardware devices coupled to the client device, the communication application may determine the number of "display browsers" and the number of "control browsers" that should be included in the communication environment provided by the client device. In the examples included herein, one display browser and one control browser are discussed. However, in alternative embodiments, two or more display browsers and/or two or more control browsers may be implemented. Each of the two or more display browsers may present the same or a different interface. Similarly, each of the two or more control browsers may present the same or a different interface.

Continuing with the example of one display browser and one control browser, at stage 808, the communication application opens a first browser window and a second browser window. The first browser window may be opened on a first display device coupled to the client device. In one embodiment, the first browser window comprises a "display browser," as described herein. The second browser window may be opened on a second display device coupled to the client device. In one embodiment, the second browser window comprises a "control browser," as described herein.

At stage 810, each of the first and second browser windows downloads a JavaScript from remote server. The remote server may comprise one or more of the connection server 304, room server 306, and reflector 308 described above in FIG. 4. The JavaScript includes instructions for presenting a communication session to a user. The JavaScript may be periodically updated on the remote server. When the browser downloads the JavaScript from the remote server, the browser retrieves the latest version of the JavaScript. In other embodiments, instructions for presenting the communication session are downloaded from the remote server in a format other than JavaScript.

At stage 812, each of first and second browser windows establishes a connection with the remote server. In one embodiment, the connection between each browser and the remote server is over HTTP. For example, the connection may implement the "hanging get" protocol.

At stage 814, each of first and second browser windows establishes a connection with the local server. In one embodiment, the connection between each browser and the remote server is over the WebSocket protocol. A user may then create or join a communication session by entering a session name into the control browser in the appropriate field of a control browser. The control browser communicates this information to the display browser (i.e., for display) and to the remote server, as described in FIG. 4.

Once the user has established a connection with a particular communication session and the communication session is in progress, the user may wish to alter some aspect of the communication session. As described, the user may enter appropriate inputs into the control browser. The inputs are then conveyed to the display browser and to the client devices of the other users participating in the communication session.

Figure 9:
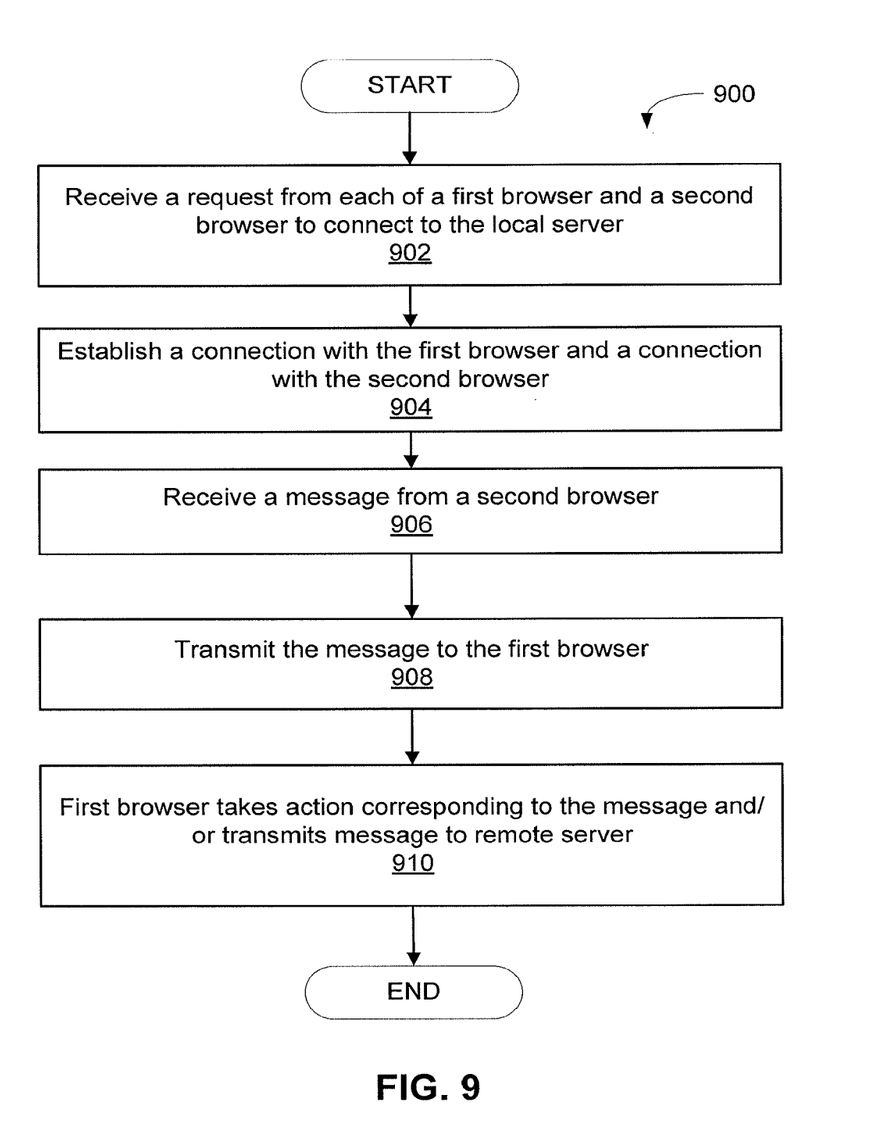
FIG. 9 is a flowchart illustrating communication between two web browsers via local server, according to one embodiment.

FIG. 9 is a flowchart illustrating communication between two web browsers via local server, according to one embodiment. Persons skilled in the art will understand that even though the method 900 is described in conjunction with the systems of FIGS. 1-7, any system configured to perform the method stages is within the scope of embodiments of the disclosure.

As shown, at stage 902, a local server receives a request from each of a first browser and a second browser to connect to the local server. As described above, the local server is executing on the same client device as first browser (e.g., "display browser") and second browser (e.g., "control browser").

At stage 904, the local server establishes a connection with the first browser and a connection with the second browser. As described, the connections may be WebSocket connections.

At stage 906, the local server receives a message from a second browser. In one embodiment, the message may relate to changing an aspect of a communication session. Additionally, any message that is to be communicated between two browsers is within the scope of embodiments of the disclosure.

At stage 908, the local server transmits the message to the first browser. The message is transmitted to the first browser via the connection (e.g., WebSocket connection) between the local server and the first browser.

In this manner, the first and second web browsers can communicate with one another without accessing a remote server. This feature is accomplished via a local server, such as a WebSocket server, executing on the same client device. More efficient operation is thereby achieved.

In the example embodiments, the various applications can be configured on any distributed or embedded platform within a single physical location or multiple locations. As such, embodiments contemplate that applications, resources, managers, servers, etc. may be joined or separated without diverging from their identities and functions. For example, a "server device" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A video conferencing system, comprising:
a first local client device having a content display device; and
a first web browser executing on the first local client device, the first web browser in communication with one or more remote servers, the first web browser displaying on the content display device content of a communication session provided by at least one of the one or more remote servers during the communication session,
wherein the first web browser is configured to receive a command to control communication of the content provided by the at least one of the one or more remote servers during the communication session, wherein the command is received by the first web browser independently of communications with the one or more remote servers, wherein the command is received from a local communication server executing on a second local client device, wherein the local communication server is in communication with a second web browser executing on the second local client device, the second web browser:
displaying a control interface on a control display device of the second local client device, and
receiving the command through the control interface of the control display device for controlling communication of the content provided by the at least one of the one or more remote servers during the communication session.

2. A video conferencing system, comprising:
a first local client device having a content display device;
a local communication server executing on the first local client device; and
a first web browser executing on the first local client device, the first web browser in communication with one or more remote servers and the local communication server, the first web browser displaying on the content display device content of a communication session, the content provided by at least one of the one or more remote servers during the communication session,
wherein the first web browser is configured to receive a command via the local communication server to control communication of the content provided by the at least one of the one or more remote servers during the communication session, wherein the command is received by the first web browser independently of communications with the one or more remote servers, wherein the command is received from a second web browser executing on a second local client device, the second web browser:
in communication with the local communication server, displaying a control interface on a control display device of the second local client device, and
receiving the command through the control interface of the control display device for controlling communication of the content provided by the at least one of the one or more remote servers during the communication session.

3. The video conferencing system of claim 2, wherein one or more of the one or more remote servers establishes and manages the communication session between client devices participating in the communication session.

4. The video conferencing system of claim 2, wherein one or more of the one or more remote servers provides the content of the communication session to the client devices during the communication session.

5. The video conferencing system of claim 2, wherein the command is communicated by the first web browser to one or more of the one or more remote servers.

6. The video conferencing system of claim 2, wherein the first local client device and the second local client device are the same device.

7. The video conferencing system of claim 2, wherein the content comprises video and audio.

8. The video conferencing system of claim 2, wherein the local communication comprises a WebSocket server.

9. The video conferencing system of claim 2, wherein the first browser displayed by the content display device and the second browser displayed by the control display device are displayed in full screen mode.

10. The video conferencing system of claim 2, wherein the command is a mute command.

11. The video conferencing system of claim 2, wherein the content is received from the reflector server via a TCP (Transmission Control Protocol) packet or a UDP (User Datagram Protocol) packet.

12. The video conferencing system of claim 2, wherein the first browser is in communication with the local communication server and one or more of the one or more remote servers using HTTP (Hypertext Transfer Protocol).

13. The video conferencing system of claim 2, wherein the second web browser is in communication with one or more of the one or more remote servers.

14. A method for providing a conferencing system, comprising:
executing a local communication server on a first local client device, the first local client device having a content display device; and
executing a first web browser on the first local client device, the first web browser in communication with one or more remote servers and the local communication server, the first web browser displaying on the content display device content of a communication session provided by at least one of the one or more remote servers during the communication session,
wherein the local communication server is in communication with a second web browser executing on a second local client device, the second local client device having a control display device, the second web browser in communication with the local communication server, the second web browser displaying a control interface on the control display device, the second web browser receiving a command through the control interface of the control display device for controlling communication of the content provided by the at least one of the one or more remote servers during the communication session and transmitting such command via the local communication server to the first web browser such that the command is received by the first web browser independently of communications with the one or more remote servers.

15. The method of claim 14, wherein one or more of the one or more remote servers establishes and manages the communication session between client devices participating in the communication session.

16. The method of claim 14, wherein one or more of the one or more remote servers provides the content of the communication session to the client devices during the communication session.

17. The method of claim 14, wherein the command is communicated by the first web browser to one or more of the one or more remote servers.

18. The method of claim 14, wherein the first local client device and the second local client device are the same device.

19. The method of claim 14, wherein the local communication server comprises a WebSocket server.

20. The method of claim 14, wherein the command is a mute command.

* * * * *